A. M. LAYCOCK.
ROLLER BEARING.
APPLICATION FILED DEC. 18, 1915.
1,263,573.
Patented Apr. 23, 1918.
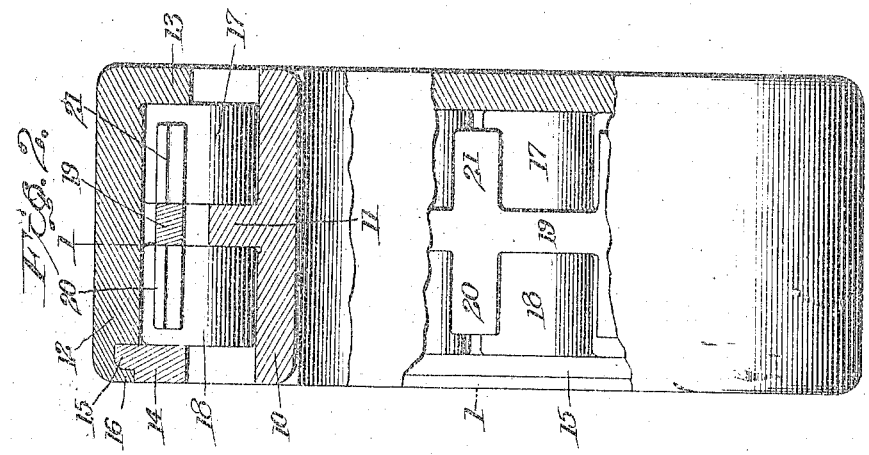
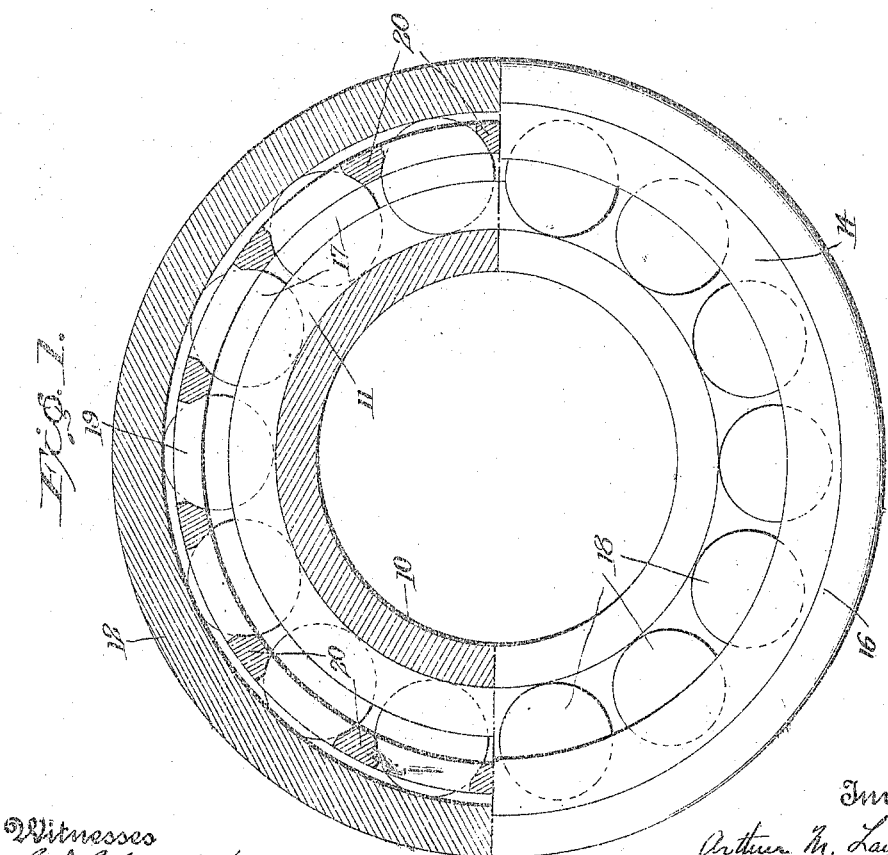
Witnesses
Inventor
Arthur M. Laycock
Foster, Freeman, Watson & Coit
Attorneys

UNITED STATES PATENT OFFICE.

ARTHUR M. LAYCOCK, OF KINGSTON, PENNSYLVANIA.

ROLLER-BEARING.

1,263,573.　　　　Specification of Letters Patent.　　Patented Apr. 23, 1918.

Application filed December 18, 1915. Serial No. 67,647.

*To all whom it may concern:*

Be it known that I, ARTHUR M. LAYCOCK, a subject of the King of Great Britain, and a resident of Kingston, county of Luzerne, State of Pennsylvania, have invented certain new and useful Improvements in Roller-Bearings, of which the following is a specification.

This invention relates to roller bearings and has for its object the provision of a bearing of simple construction adapted for heavy service and which will be comparatively inexpensive to manufacture.

Other objects and the features of novelty will be apparent from the following description taken in connection with the accompanying drawings, in which, Figure 1 is a side elevation of a bearing embodying the invention, a portion of the figure being a section on the line 1—1 of Fig. 2; and Fig. 2 is an edge view of the bearing shown in Fig. 1, with parts broken away and other parts shown in section.

Referring to the drawings, 10 indicates the inner ring of the bearing which is provided with a central radial flange 11 on its exterior and which is preferably without side flanges. The outer ring 12 is preferably provided with side flanges, one of which, indicated at 13, is formed integral with the ring and the other indicated at 14 is preferably attached to the ring in any suitable manner and in Fig. 2 is shown as being attached by the coöperating flanges 15 and 16, the latter being turned over the former after the parts have been assembled. Spaces are provided on the opposite sides of the flange 11 for two series of rollers 17 and 18, the former series being arranged between the flanges 11 and 13 and the latter series being arranged between the flanges 11 and 14, the flanges coöperating to transmit end thrust from one ring to the other. In order to avoid any tendency for the rollers to tilt, due to end thrust thereon, and also to provide separators for the rollers, a loose ring 19 is provided in alinement with the flange 11 and in contact with the inner ends of the rollers. The ring 19 is provided with the oppositely projecting arms 20 and 21 which extend between the rollers and serve as separators to maintain the rollers in the desired spacing. It will be understood that in the operation of the bearing the ring 19 will be carried around with the rollers although at all times serving to transmit end thrust from one series of rollers to the other.

It will be evident to those skilled in the art that changes in the minor details of construction may be made without departing from the spirit of the invention as defined in the appended claims.

Having described the invention what is claimed and desired to be secured by Letters-Patent is, 1. In a roller bearing, the combination of an inner ring, an outer ring, one of said rings having an integral central radial flange and the other of said rings having flanges at its sides, the side surfaces of all said flanges being in planes perpendicular to the axis of the bearing, two series of flat ended cylindrical rollers arranged on opposite sides of said central radial flange, and a ring in alinement with and of the same width as said central flange adapted to be engaged by the inner ends of both of said sets of rollers and having laterally projecting arms on opposite sides thereof serving as separators for the rollers.

2. In a roller bearing, the combination of an inner ring provided with an integral central radial flange, an outer ring having side flanges, the said surfaces of all said flanges being in planes perpendicular to the axis of the bearing, two series of flat ended cylindrical rollers arranged on opposite sides of said central radial flange, and a ring surrounding said central radial flange adapted to be engaged by the inner ends of both of said sets of rollers and have laterally projecting arms on opposite sides thereof serving as separators for the rollers.

In testimony whereof I affix my signature.

ARTHUR M. LAYCOCK.